United States Patent [19]
Brech

[11] Patent Number: 5,953,535
[45] Date of Patent: Sep. 14, 1999

[54] USING INTELLIGENT BUS BRIDGES WITH PICO-CODE TO SERVICE INTERRUPTS AND IMPROVE INTERRUPT RESPONSE

[75] Inventor: Brad Louis Brech, Rochester, Minn.

[73] Assignee: International Business Machines Corporation, Armonk, N.Y.

[21] Appl. No.: 08/826,032

[22] Filed: Mar. 28, 1997

[51] Int. Cl.⁶ .......................................... G06F 9/46
[52] U.S. Cl. ............................. 395/733; 395/591
[58] Field of Search .................. 395/733–742, 395/591, 306–309

[56] References Cited

U.S. PATENT DOCUMENTS

| | | | |
|---|---|---|---|
| 5,261,107 | 11/1993 | Klim et al. ............................... | 395/725 |
| 5,274,795 | 12/1993 | Vachon .................................... | 395/500 |
| 5,446,869 | 8/1995 | Padgett et al. ........................... | 395/500 |
| 5,473,763 | 12/1995 | Stewart et al. .......................... | 395/375 |
| 5,495,615 | 2/1996 | Nizar et al. .............................. | 395/733 |
| 5,530,891 | 6/1996 | Gephardt ................................. | 395/800 |
| 5,548,730 | 8/1996 | Young et al. ............................ | 395/280 |
| 5,553,293 | 9/1996 | Andrews et al. ........................ | 395/734 |
| 5,555,420 | 9/1996 | Sarangdhar et al. .................... | 395/739 |
| 5,555,430 | 9/1996 | Gephardt et al. .................. | 395/800.16 |
| 5,727,227 | 3/1998 | Schmidt et al. .................... | 395/800.36 |
| 5,751,975 | 5/1998 | Gillespie et al. ....................... | 395/306 |
| 5,761,461 | 6/1998 | Neal et al. ............................... | 395/309 |

OTHER PUBLICATIONS

IBM Technical Disclosure Bulletin, "Milli–Code," vol. 35, No. 4A, Sep. 1992.
IBM Technical Disclosure Bulletin, "Progammable, Expandable Interrupt Controller," J.M. Higdon and F.D. Wright, vol. 24, No. 5, Oct. 1981.

Primary Examiner—Ayaz R. Sheikh
Assistant Examiner—Sumati Lefkowitz
Attorney, Agent, or Firm—Jack V. Musgrove; Andrew J. Dillon

[57] ABSTRACT

A computer system having an improved method of handling interrupts associated with I/O operations to reduce interrupt latencies. The computer system includes one or more processing units, a memory device (e.g., RAM) connected to the processing unit via a system bus, and a plurality of I/O devices providing interrupt sources, connected to the processor via an I/O bus and a bus bridge. The bus bridge has incorporated therein or connected thereto means for intercepting interrupt requests transmitted to the processing unit and handling the interrupt requests without suspending the current process in the processing unit. In the preferred embodiment, the means for intercepting and handling the interrupts includes a storage device or array having pico-code instructions which are scheduled for execution in a sequencer by the interrupt control logic. If the pico-code sees an interrupt that it is not programmed to handle (such as an exception), it can pass that interrupt to the appropriate processing unit for handling. Additional bus bridges having pico-code instructions can be provided for multi-bus systems having additional interrupt sources connected via other busses.

7 Claims, 3 Drawing Sheets

USING INTELLIGENT BUS BRIDGES WITH PICO-CODE TO SERVICE INTERRUPTS AND IMPROVE INTERRUPT RESPONSE

BACKGROUND OF THE INVENTION

1. Field of the Invention

The present invention generally relates to computer systems and, more particularly, to a method and apparatus for reducing interrupt latencies associated with input/output operations.

2. Description of the Related Art

A conventional computer system 10 is shown in FIG. 1 and includes one or more central processing units (CPUs) 12a, 12b and 12c; a main memory unit 14 (such as random-access memory or RAM) that is used by the processing units to carry out program instructions; and one or more input/output (I/O) units 16a, 16b, and 16c, such as a display monitor, keyboard, pointing device (mouse), and a permanent memory device (such as a hard disk or floppy diskette) for storing the computer's operating system and user programs. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter might be used with a video display monitor, or a memory controller might be used with memory 14. Also, processing units 12a, 12b and 12c may each be comprised of several components, such as the processor core (which includes various registers and logic units), one or more memory caches, and a bus interface.

In earlier computer systems, the processing unit(s) communicated with the other devices by a single system bus 18, but later computer systems eased loading of the system bus by providing a second, I/O bus 20, which is connected to the various I/O devices 16a, 16b, and 16c and to system bus 18 by a bus bridge 22. I/O bus 20 may be any suitable bus useful for interconnecting the various I/O devices mentioned above as well as other devices such as a local-area network (LAN) adapter. Exemplary bus standards include the ISA (industry standard architecture) bus, the EISA (extended industry standard architecture) bus, and the PCI (peripheral component interconnect) bus. Other means can also be provided for the various system devices to communicate with each other, such as direct memory access (DMA) channels which allow devices to communicate directly with one another, i.e., bypassing the processing units.

During I/O operations, various I/O devices (or the software device drivers controlling them) may issue "interrupt" signals to cause a processing unit to suspend its current procedure and save its status, and temporarily transfer control to a special routine such as an interrupt handler which then carries out a particular set of predetermined instructions to attend to the cause of the interrupt. Interrupts can occur during normal device operation, or due to abnormal (unexpected) circumstances, i.e., an "exception." A processor can further receive multiple interrupts from different sources; in which case, a set of interrupt priorities is used to determine which signal is handled first. After handling of the interrupt signal, control returns to the procedure that was being executed by the processing unit.

Many advances have allowed computer systems to operate at higher speeds, such as by increasing cache size and complexity. It is not always possible, however, to take full advantage of these speed gains due to other problems, such as the frequency of I/O operations. Two components of I/O operations that slow a system down are the interrupt processing delays (latencies) and the relatively slow operation of the I/O busses. For example, even on a PCI bus running at 33 MHz, an average "write" operation takes about 180 ns to complete; this is equal to 34 instructions on a 200 MHz processor. The ratio grows larger with tiered bus structures and distributed I/O devices. Also, new adapter cards are placing shorter interrupt latency requirements on systems, due to faster communication line speeds and faster devices. Again, this problem is multiplied in a tiered-bus structure.

To address the latency problems associated with I/O operations, some computer systems add special hardware for dealing with interrupt handling outside of the main processing unit(s). For example, the AS/400 computing system marketed by International Business Machines Corp. employs an I/O processor (IOP) to move the interrupt processing closer to the I/O devices. A similar design, described in U.S. Pat. No. 5,548,730, uses an intelligent bridge that contains a full microprocessor and its supporting functions (memory control, bus control). It requires both non-volatile and volatile memory attached to boot the processor and run the functional code, and is thus a relatively expensive approach.

Another design is disclosed in U.S. Pat. No. 5,555,430 in which interrupts in a symmetric multi-processing (SMP) system are routed to a central interrupt control unit which interfaces directly with the processing units and the I/O devices. This approach does not fully address interrupt latency issues since it only allows the system to route the interrupt to a processor running the lowest priority task. See also U.S. Pat. Nos. 5,495,615, 5,530,891 and 5,555,420. All of these patents deal with the intelligent routing of interrupts, but not the servicing issues.

Yet another design for handling interrupts in an improved manner is shown in U.S. Pat. No. 5,473,763. According to that method, which may be the closest prior art to the present invention, interrupt vectors are loaded directly into an address register to minimize overhead of processing interrupts. The address registers are located in "streamlined signal processors" which are part of the main processor complex. Provision of such a data-storage processor is relatively expensive, as with the above-noted approach. Also, providing a processor as part of the main CPU complex is more limiting, since it cannot be scaled for multi-bus systems, and still has the problems attributed to the I/O latency issues.

Generally, all of the foregoing solutions not only add to cost and complexity, but add to service response times because of the need to have the two processors converse. It would, therefore, be desirable to devise a method of reducing processor workload associated with servicing interrupts, so as to reduce interrupt service latency. It would be further advantageous if this effect were achieved at a lower cost than with full I/O processor designs.

SUMMARY OF THE INVENTION

It is therefore one object of the present invention to provide an improved method of processing input/output (I/O) operations in a computer system.

It is another object of the present invention to provide such a method which reduces interrupt latencies associated with I/O operations.

It is yet another object of the present invention to provide such a method of reducing interrupt latencies which can be inexpensively implemented and is easily scalable to multi-bus systems.

The foregoing objects are achieved in a computer system generally comprising at least one processing unit, a memory device connected to the processing unit, a plurality of I/O devices providing interrupt sources, and means for interconnecting the I/O devices to the processing unit, the interconnecting means including means for intercepting interrupt requests transmitted to the processing unit and handling the interrupt requests. The processing unit can be connected to system memory using a first system bus, and the interconnecting means preferably includes a second I/O bus which is connected to the I/O devices and to a bus bridge that couples the I/O bus to the system bus. The means for intercepting and handling the interrupts is preferably located in or connected to the bus bridge, and can include a storage device or array having pico-code instructions for handling the interrupt requests. The pico-code instructions are then scheduled for execution in a sequencer by the interrupt control logic.

The present invention is easily scalable to multi-bus systems, i.e., if the computer system includes a third bus connected to additional interrupt sources, then another bus bridge may be provided having means for intercepting interrupt requests transmitted to the processing unit from the second set of interrupt sources.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
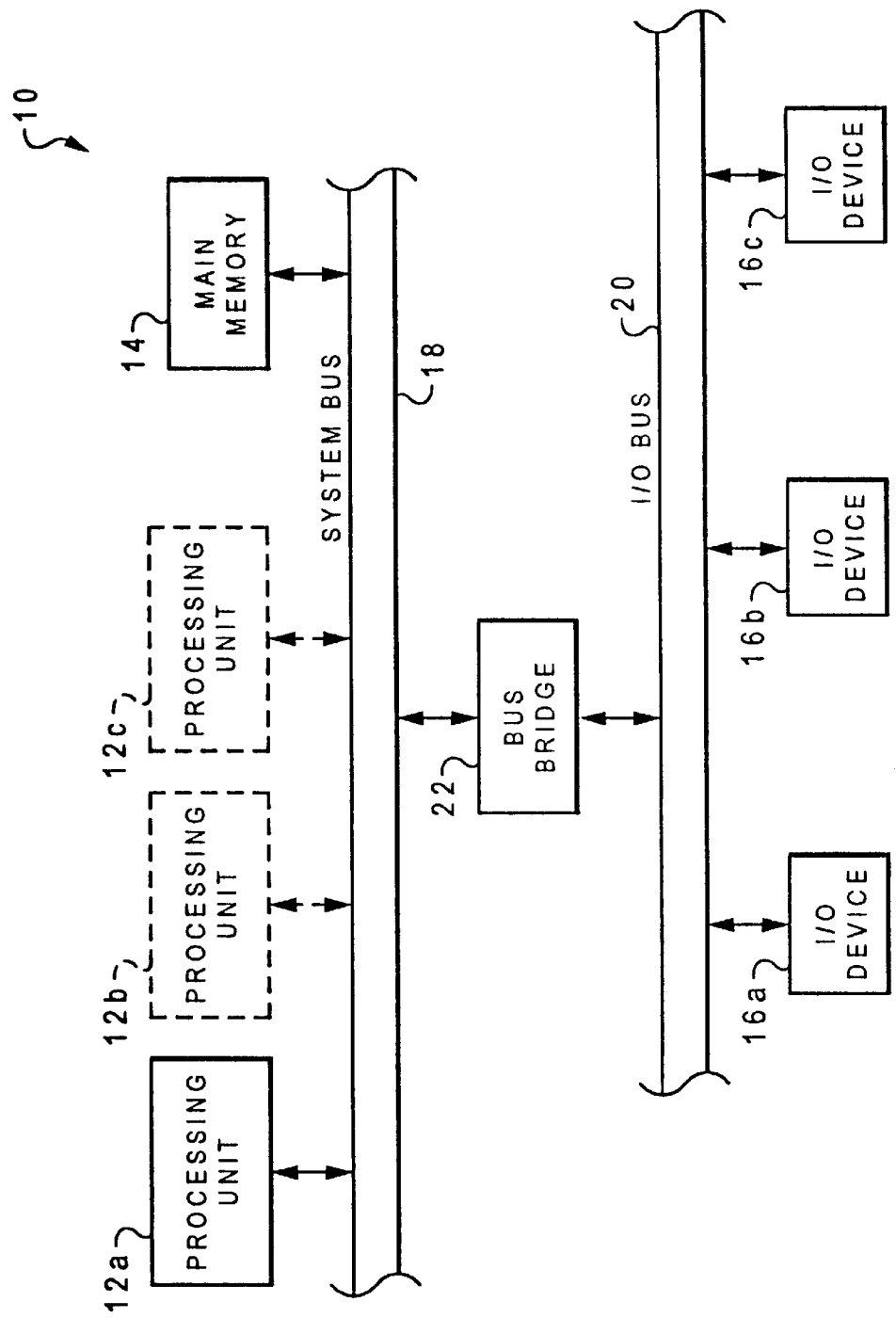
FIG. 1 is a block diagram of a prior-art computer system.
Figure 2:
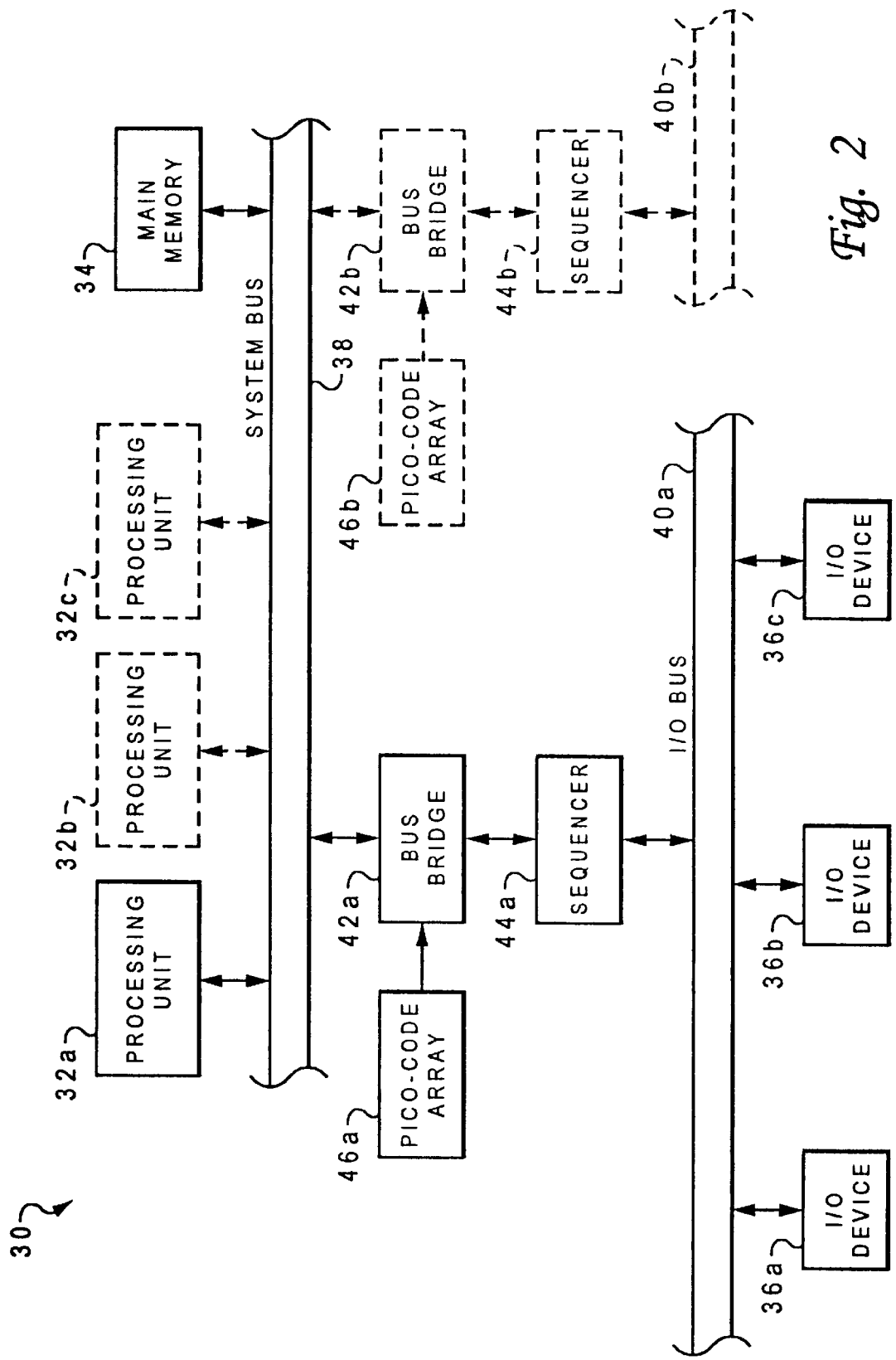
FIG. 2 is a block diagram of one embodiment of a computer system constructed in accordance with the present invention, having a sequencer used by a bus bridge to service interrupt requests.

With reference now to the figures, and in particular reference to FIG. 2, there is depicted one embodiment 30 of the computer system of the present invention. Computer system 30 is generally comprised of one or more processing units 32a, 32b and 32c; a system memory device 34 (such as random-access memory or RAM) that is used by the processing units to store data and program instructions; and one or more peripheral input/output (I/O) devices 36a, 36b, and 36c, including user interface devices such as a display monitor, keyboard, pointing device (mouse), one or more permanent memory devices (such as a hard disk, floppy diskette or CD-ROM), or a local area network (LAN) adapter. As with the prior-art system of FIG. 1, computer system 30 may have many additional components which are not shown, such as serial and parallel ports for connection to modems or printers, and other adapters or controllers, so the depicted embodiment should not be construed in a limiting sense. Processing units 32a, 32b and 32c each may similarly include several components, such as a processor core (with various registers and logic units), one or more memory caches, and a bus interface.

Processing units 32a, 32b and 32c are connected to system memory 34 by a system bus 38, and are connected to I/O devices 36a, 36b and 36c via a first I/O bus 40a, a first bus bridge 42a, and a first sequencer 44a. Bus bridge 42a provides the interface between the I/O devices and system bus 38, and sequencer 44a provides a means of handling interrupt requests from the various I/O devices, as explained further below. I/O bus 40a may be of any suitable bus architecture, including but not limited to an ISA, EISA or PCI bus. Other means (not shown) can also be provided for the various system devices to communicate with each other, such as DMA channels.

In addition to conventional functionality, bus bridge 42a is used to store a pre-built pico-code sequence for each interrupt source. The pico-code sequence may take any form suitable for execution of I/O reads, I/O writes, and simple branching on compare conditions (e.g., "less than," "equal to," or "greater than"). This basic functionality is all that is required to process an interrupt from basic device adapters. The pico-code sequence can be written in assembly language, or could be constructed using "C" code with a mini-compiler (only a few instructions to support). The pico-code for each interrupt source (which can include routine or specially programmed interrupts) is stored in an array 46a and scheduled for execution in sequencer 44a by the interrupt control logic. Sequencer 44a is similar to a bus sequencer in any bus device. It must have the ability to execute I/O reads and I/O writes. It further preferably has the ability to process basic compare instructions. The following example is directed to a LAN adapter wherein a "transmit complete" interrupt occurs. After the interrupt occurs, the appropriate pico-code sequence is loaded into sequencer 44a and started. The pico-code first executes a read of the adapter main status register. The read value is compared to a mask for the "transmit complete" status and, if they are not the same (a "no" result), then the value is compared for other interrupts that can be processed, or if not, the information is packaged and sent to the host for processing. If the result of the original mask compare is "yes," then the sequencer itself attempts to process the interrupt. It next reads the transmit status register of the adapter and compares the read value to a mask for the "completion without error" status, and if they are the same (a "yes" result), the sequencer writes to the adapter to instruct it to get the next transmit from the queue. If the result of this mask compare is "no," then the transmit process is halted on the adapter (an I/O write). The error information is then packaged and sent to the host for further processing.

The pico-code can interrogate the interrupt and act to handle the interrupt without any of the processing units 32a, 32b or 32c being interrupted. If the pico-code sees an interrupt that it is not programmed to handle, it can pass that interrupt to the appropriate processor for handling. In this manner, only normal interrupts need to be supported by the pico-code, thus keeping the array size small. For example, with a communications adapter, "receive" and "transmit complete" interrupt signals could be addressed in pico-code, but exceptions would be passed directly to the main processor complex, with the only value of the pico-code being the initial hardware status interrogation. Of course, larger arrays can be provided to cover any or all possible interrupts, including exceptions. Furthermore, even in those cases where the interrupt to be serviced cannot be handled by the pico-code, the sequencer can still gather the information into a memory area for the host CPU to process, thus offloading the CPU from having to execute I/O reads, which are slow and expend host CPU cycles waiting for the I/O to complete.

The present invention is easily adapted to multi-bus systems. For example, other interrupt sources (i.e., other peripheral devices) can be interconnected to computer system using a second bus 40b, a second bus bridge 42b, a second sequencer 44b, and a second pico-code array 46b. The same principle can be applied to tiered-bus structures. While separate pico-code arrays are shown for the two secondary bus structures, those skilled in the art will appreciate that a single pico-code array may alternatively be provided for use by all of the bus bridges in the system. Also, while the pico-arrays are depicted as separate from the bus bridges, they can easily be incorporated into the bus bridges, and a sequencer can similarly be incorporated into an integrated bus bridge.

Figure 3:
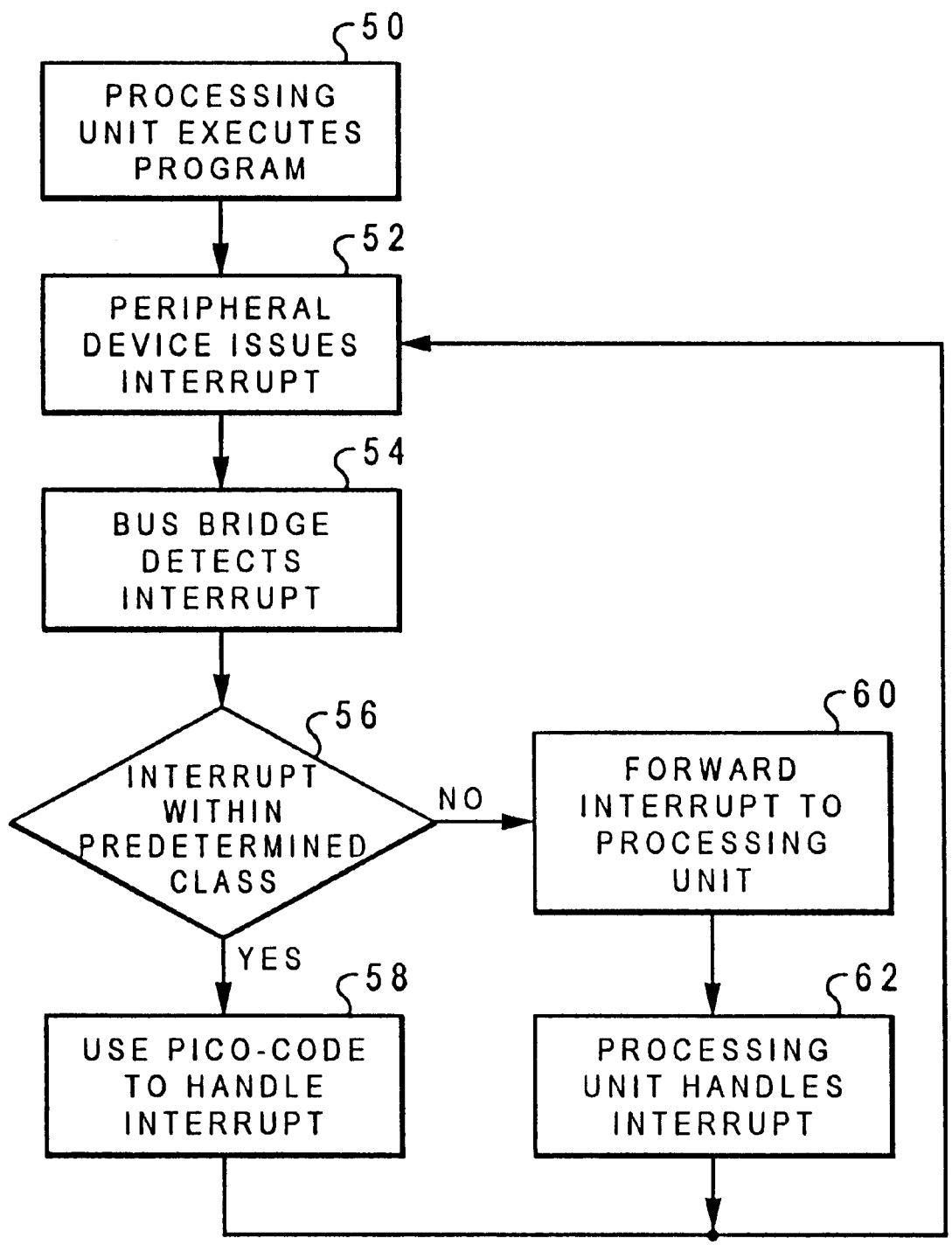
FIG. 3 is a chart depicting the logic flow associated with the method of handling logic requests according to the present invention.

The present invention can be further understood with reference to the flow chart of FIG. 3. First, the computer system (i.e., the processing units) begin execution of a program, whether part of the operating system or a user application (50). During program execution, some peripheral device issues an interrupt request (52). This request is detected by the bus bridge (54), i.e., intercepted before reaching the relevant processing unit. The bus bridge then examines the interrupt to determine whether it falls within one of the predetermined classes of interrupts which can be handled by the pre-built pico-code (56). If so, the appropriate pico-code is scheduled for execution in the sequencer to handle the interrupt (58), without disturbing the current process in the processing unit. If not, the interrupt is passed to the appropriate processing unit (60) which suspends its current process to handle the interrupt (62). This procedure is repeated for each interrupt request.

The foregoing design and method allows computer system 30 to operate at faster speeds, more easily accommodating adapter cards and other devices which require reduced interrupt latencies, and complementing other features (such as larger and more complicated cache hierarchies) that contribute to faster overall performance. The reduction in interrupt service latency is furthermore achieved at a lower cost when compared to prior-art designs that require an additional interrupt or I/O processor outside the main processor complex.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

I claim:

1. A method of handling an interrupt request in a computer system having one or more processing units connected to a system bus, and one or more input/output (I/O) devices connected to an I/O bus, with a bus bridge interconnecting the system and I/O busses, the method comprising the steps of:

providing a storage device having pico-code instructions for handling one or more interrupt requests, the storage device being connected to the bus bridge;

detecting the interrupt request with the bus bridge, wherein the interrupt request may be of a class not covered by the pico-code instructions;

determining whether the interrupt request is within the class covered by the pico-code instructions and, if not, forwarding the interrupt request to a processing unit for handling; and handling the interrupt request using the pico-code instructions carried out by a sequencer connected to the bus bridge.

2. The method of claim 1 wherein the computer system further includes a sequencer connected to the bus bridge, and further comprising the step of scheduling the pico-code instructions for execution in the sequencer using interrupt control logic in the bus bridge.

3. A computer system comprising:

at least one processing unit;

a memory device connected to said processing unit;

a plurality of I/O devices providing interrupt sources; and means for interconnecting said I/O devices to said processing unit, said interconnecting means including means for storing a plurality of pico-code instruction sequences, each sequence adapted to handle a different one of a plurality of interrupt requests from said interrupt sources, and said interconnecting means further including means for intercepting interrupt requests transmitted to said processing unit and handling said interrupt requests using said pico-code instruction sequences.

4. The computer system of claim 3 wherein:

said processing unit is connected to said memory device using a first bus; and said interconnecting means includes a second bus connected to said I/O devices, and a bus bridge connecting said first bus to said second bus.

5. The computer system of claim 4 wherein said storing means comprises a storage array, and said bus bridge is connected to said storage array.

6. The computer system of claim 4 wherein said I/O devices constitute a first set of I/O devices, and said bus bridge includes said interrupt handling means which handles only interrupts from said first set of I/O devices, and further comprising:

a second set of I/O devices;

a third bus connected to said second set of I/O devices; and another bus bridge connecting said first bus to said third bus, said other bus bridge including additional means for storing a plurality of pico-code instruction sequences, each sequence adapted to handle a different one of a plurality of interrupt requests from said interrupt sources, and said other bus bridge further including additional means for intercepting interrupt requests transmitted to said processing unit from said second set of I/O devices and handling said interrupt requests from said second set of I/O devices using said pico-code instruction sequences in said additional storing means.

7. The computer system of claim 5 wherein said interconnecting means includes a sequencer for executing said pico-code instruction sequences.

* * * * *